US012704637B2

(12) United States Patent
Melgård et al.

(10) Patent No.: US 12,704,637 B2
(45) Date of Patent: Aug. 11, 2026

(54) TIMESCALE DISSEMINATION USING GLOBAL NAVIGATION SATELLITE SYSTEMS AND APPLICATIONS THEREOF

(71) Applicant: FNV IP B.V., Leidschendam (NL)

(72) Inventors: Tor Egil Melgård, Oslo (NO); Ole Petter Rønningen, Haugesund (NO)

(73) Assignee: FNV IP B.V., Leidschendam (NL)

( * ) Notice: Subject to any disclaimer, the term of this patent is extended or adjusted under 35 U.S.C. 154(b) by 616 days.

(21) Appl. No.: 18/007,490

(22) PCT Filed: Aug. 3, 2021

(86) PCT No.: PCT/NL2021/050490

§ 371 (c)(1),
(2) Date: Jan. 31, 2023

(87) PCT Pub. No.: WO2022/031168

PCT Pub. Date: Feb. 10, 2022

(65) Prior Publication Data

US 2023/0305165 A1 Sep. 28, 2023

(30) Foreign Application Priority Data

Aug. 4, 2020 (NL) ..................................... 2026210

(51) Int. Cl.

| | |
|---|---|
| ***G01S 19/07*** | (2010.01) |
| *G01S 19/04* | (2010.01) |
| *G01S 19/41* | (2010.01) |

(52) U.S. Cl.

CPC ............ *G01S 19/073* (2019.08); *G01S 19/07* (2013.01); *G01S 19/071* (2019.08); *G01S 19/04* (2013.01); *G01S 19/41* (2013.01)

(58) Field of Classification Search

CPC ...... G01S 19/07; G01S 19/073; G01S 19/071; G01S 19/04; G01S 19/41

(Continued)

(56) References Cited

U.S. PATENT DOCUMENTS 6,952,182 B2 * 10/2005 Spilker, Jr. .......... H04N 21/8126 342/464
7,158,080 B2 * 1/2007 van Diggelen .......... G01S 19/27 342/357.42

(Continued)

FOREIGN PATENT DOCUMENTS

CN 106547001 A 3/2017
CN 108027443 A 5/2018

(Continued)

OTHER PUBLICATIONS

Kuykendall et al, "In Sync with GPS: GPS Clocks for the Wireless Infrastructure", available via http://www.4timing.com/SyncGPS.pdf.

(Continued)

*Primary Examiner* — Chuong P Nguyen
(74) *Attorney, Agent, or Firm* — Polsinelli PC

(57) ABSTRACT

A method and apparatus for dissemination of a timescale signal (T2) from at least one server site to at least one client site is provided. The method comprises running, at each server site, a server Global Navigation Satellite System, GNSS, process (202(*i*)) configured to generate a server GNSS output raw data signal (R7(T2); R7(T2(*i*))) based at least on one or more first satellite signals; generating a precise orbits and clocks signal (C8(T2); C10(T2); T4(Tppp−T2); T9(Tppp−T2)) embedding said timescale signal (T2) based on all server GNSS output signals (T2(*i*); T7(T2(*i*))) and broadcasting said precise orbits and clocks signal (C8(T2); C10(T2); T4(Tppp−T2); T9(Tppp−T2)) via a telecom network (206); running, at each client site, a client Global Navigation Satellite System, GNSS, process (201(*c*)) configured to generate a client GNSS output raw data signal (R5(T1(*c*))) based on a client clock signal (T1(*c*)) and based on one or more second satellite signals, running a client Precise Point Positioning, PPP, process (203(*c*)) configured (Continued)

to receive said client GNSS output raw data signal (R5(T1(*c*))) and said precise orbits and clocks signal (C8(T2); C10(T2); T4(Tppp−T2); T9(Tppp−T2)) and to generate a difference signal (T1(*c*)−T2) between said client clock signal (T1(*c*)) and timescale signal (T2).

20 Claims, 8 Drawing Sheets

(58) Field of Classification Search
USPC .......................... 342/357.41, 357.44, 357.24
See application file for complete search history.

(56) References Cited

U.S. PATENT DOCUMENTS

| | | | | |
|---|---|---|---|---|
| 9,739,888 | B2 * | 8/2017 | Cheng | G01S 19/27 |
| 10,191,157 | B2 * | 1/2019 | Dai | G01S 19/071 |
| 10,524,226 | B2 * | 12/2019 | Chen | G01S 5/0036 |
| 10,627,528 | B2 * | 4/2020 | Lie | G01S 19/426 |
| 11,187,813 | B2 * | 11/2021 | Brandl | G01S 19/20 |
| 11,513,232 | B2 * | 11/2022 | Reid | G01S 19/02 |
| 11,525,924 | B2 * | 12/2022 | Hauschild | G01S 19/07 |
| 11,846,714 | B2 * | 12/2023 | Wang | G01S 19/44 |
| 12,032,076 | B2 * | 7/2024 | Gunning | G01S 19/074 |
| 12,092,997 | B2 * | 9/2024 | Shi | G04R 20/02 |
| 12,117,533 | B1 * | 10/2024 | Rao | G01S 19/04 |
| 12,228,658 | B2 * | 2/2025 | Perriam | G01S 19/26 |
| 2003/0156063 | A1 | 8/2003 | Spilker et al. | |
| 2006/0290566 | A1 | 12/2006 | Syrjarinne et al. | |
| 2017/0299731 | A1 | 10/2017 | Lie et al. | |
| 2019/0110270 | A1 | 4/2019 | Chen | |
| 2022/0244403 | A1 * | 8/2022 | Bellad | G01S 19/258 |
| 2022/0291392 | A1 * | 9/2022 | Schempp | G01S 19/07 |

FOREIGN PATENT DOCUMENTS

| | | | | | |
|---|---|---|---|---|---|
| CN | 115801174 | A | * | 3/2023 | H04J 3/06 |
| CN | 116224746 | A | * | 6/2023 | G04F 5/14 |
| CN | 118033696 | A | * | 5/2024 | G01S 19/37 |
| RU | 2445645 | C2 | * | 3/2012 | G01S 19/05 |
| WO | WO-2012093249 | A1 | * | 7/2012 | G01S 19/46 |
| WO | 2015020551 | A1 | | 2/2015 | |
| WO | 2020/101518 | A1 | | 5/2020 | |
| WO | WO-2024112700 | A1 | * | 5/2024 | G01S 19/02 |

OTHER PUBLICATIONS

Rønningen et al., "A novel PPP Disciplined Oscillator".
Guojun Li et al., "Using IGS RTS Products for Real-Time Subnanosecond Level Time Transfer".
Defraigne et al 2016, "Monitoring of UTC(k)'s using PPP and IGS real-time products", GPS Solut (2015) 19:165-172.
Rønningen, "Gps assisted Frequency Transfer: ADEV e-14 in 2000 seconds", Public Disclosure by Ole Ronningen via his own website.
Office Action for Chinese Application No. 202180056741, dated Apr. 14, 2025, 23 pages.

* cited by examiner

TIMESCALE DISSEMINATION USING GLOBAL NAVIGATION SATELLITE SYSTEMS AND APPLICATIONS THEREOF

FIELD OF THE INVENTION

The present invention relates to a method and system of dissemination of a time signal and applications of the disseminated timescale signal.

BACKGROUND ART

Precise Point Positioning, PPP, is a technique which can be used to measure stability of a clock and its frequency offset. Typically, single/dual frequency carrier phase and code observations from a Global Navigation Satellite System, GNSS, receiver clocked by a local oscillator of interest are collected over a sufficiently long period of time. At least one PPP processor (e.g. 2) combines these observations with precise orbit and clock corrections, made available by a commercial operator, a public office, for instance the International GNSS Service, IGS, or one of their associated Analysis Centers, as well as several modelled effects such as Solid Earth Tide, in for instance a Kalman filter and estimates the GNSS receivers' position and the clock bias of the local oscillator.

The clock bias of the local oscillator is of interest in applications requiring a precise time/frequency reference or involving time/frequency transfer. The PPP process may be considered as a phase detector, comparing the GNSS receivers' local oscillator with a timescale, Tppp. Tppp is a timescale embedded into precise orbit and clock corrections. Quite frequently, timescale Tppp is defined without using high-end oscillators.

By processing observations from two separate receiver/clocks, a comparison between the two clocks can be found by simple differencing the two clock biases estimated by the at least one PPP processor.

A typical prior art setup is shown in FIG. 1. The setup comprises a plurality of GNSS receivers 201, 202, and their respective clocks, each GNSS receiver-clock combination located at a separate site. The clock of GNSS receiver 201 may generate a clock signal T1. The clock of GNSS receiver 202 may generate a second clock signal T2. Both GNSS receivers 201 and 202 are disposed with an antenna 211 and 213, respectively, to receive signals from a plurality of satellites 205(*s*), s=1, 2, . . . , S. Further components, specific to each site, are described in detail below.

Local Site

The clock 212 of GNSS receiver 201, disposed at a local site, may be a crystal oscillator (oven controlled (OC)-XO) 212. The oscillator 212 may be a disciplined oscillator, which produces the clock signal T1. The local site further comprises a plurality of, e.g. two, PPP processors, 203 and 210. Each PPP processor 203, 210 is configured to receive a correction signal C(Tppp) incorporating said Tppp from a corrections generator 204. Tppp acts as the reference clock signal.

PPP Processor 203 further receives a GNSS raw-data signal R5(T1) from GNSS receiver 201 which depends on clock signal T1 as indicated by R5(T1). Thus, PPP processor 203 obtains information about clock signal T1 from R5(T1). It then calculates the difference between the reference clock signal Tppp and clock signal T1, to generate a time signal T3=Tppp−T1.

PPP processor 210 receives an output raw data signal R7(T2) from GNSS receiver 202, and obtains information about clock signal T2 from R7(T2), as indicated by R7(T2). PPP processor 210 may be coupled to a communication network 206 via a transceiver 220, in order to receive signal R7(T2) from a remote site. The output GNSS raw-data signals R5(T1) and R7(T2) are calculated based on at least one satellite 205(*s*) signal and the respective clock signals T1 and T2.

PPP processor 210 then calculates the difference between reference clock signal Tppp and clock signal T2, to generate a time signal, T4=Tppp−T2. Clock T2 is the timescale disseminated from a remote (server) site to the local (client) site. Terms "clock signal", "time signal" and "timescale" are used interchangeably herein and are intended to mean the same. For example, the clock signal T1 is a time signal. This is clear to a person skilled in the art.

A comparator 207 at the local site receives and processes time signals T3 and T4, to generate time signal T6=T4−T3=(Tppp−T2)−(Tppp−T1)=T1−T2. The reference clock signal Tppp is cancelled out in the process.

Time signal T6 may be used to discipline local oscillator 212, so that it follows T2 closely. This may be done using a phase locked loop (PLL) 208 and a digital to analog convertor 209. Alternatively, a direct digital synthesizer (DDS) could be used to discipline the local oscillator. Both methods are known to a skilled person.

FIG. 1 shows separate PPP processors 203 and 210, as well as separate comparator 207. As will be evident to a person skilled in the art, however, they are intended to show different functional actions that can be performed by one or more different processors and the drawing is not intended as showing any physical limitation.

Remote Site

The clock 215 of GNSS receiver 202, located at the remote site, may be an atomic oscillator (e.g. H-Maser) 215 configured to produce timescale T2. Transceiver 222 of GNSS receiver 202 is also coupled to communications network 206. Transceiver 222 transmits output raw-data signal R7(T2) to the client site via the network 206.

Problem to be Solved

The calculated difference T1−T2 at the local site is dependent on the accuracy of clock signal T2 of the remote clock. There is a need to receive at the local site, an improved remote clock signal T2 with better accuracy and/or stability, and consequently, calculate an improved T1−T2.

Further, in the above prior art setup, a large amount of GNSS raw-data R7 with embedded T2 is required to be transmitted to PPP processor/the local site. This increases the data load on communications network 206, and as a result, requires communications network 206 to be a high-capacity network. Furthermore, the prior art method may result in inaccurate analyses if an interruption in data transfer occurs between the local and the remote sites, or in case of a network shut-down. Any interruption roughly of more than 10-120 seconds will cause a complete reset of the process with a longer (half hour to several hours) initialization time with reduced accuracy during initialization.

SUMMARY OF THE INVENTION

The object of the present invention is to address and provide solutions to overcome at least the above disadvantages and shortcomings of the prior art.

The invention is defined by the independent claims. Preferred embodiments are further defined by the dependent claims.

The inherent timescale Tppp in the orbits and clocks correction signal C(Tppp) can be improved with the more precise remote clock signal which embeds timescale T2 and such an improvement may be achieved in the following ways. The accuracy of remote timescale signal T2 can be improved based on information about the precise orbit and clock signal Tppp. An improved timescale signal T2 may be achieved in the following ways.

In an aspect of the invention, an improved timescale signal T2 may be achieved in the correction signal by implementing a PPP process at the remote site (henceforth, the server site). The timescale signal T2, generated by the clock of the receiver at the server site, embedded with the precise orbit and clock signal, is transmitted to the local site (henceforth, the client site).

In another aspect, the improved T2 is the precise orbit and clock timescale signal replacing Tppp. The precise orbit and clock correction is calculated at the server site and incorporates information about clock signal T2 which may be generated by at least one high precision clock. The high precision clocks may be used to clock a plurality of GNSS receivers. Each server site may collect data from a plurality of such GNSS receivers and clock sites in different locations. These receivers may be ground reference stations which collect satellite data. The receivers may be clocked by a single clock or have their respective high precision clocks. A plurality of globally distributed GNSS receivers (ground reference stations) may be used for an improved method performance. Further, in case of a plurality of server sites, the server sites may themselves be globally distributed.

Alternately or in addition thereto, the improved time signal T2 may incorporate information about a clock signal T2 which is inherent to the high precision clock(s) of the satellite(s). This variant enables a precise time signal to be calculated without the need for a high precision clock at the GNSS receivers' side.

In a yet another aspect, the improved time signal T2 is a clock offset estimate which is generated by calculating the difference between the precise orbit and clock signal Tppp and the clock signal T2 of the clock at the server site. Like embodiment 1, this involves running a PPP process at the server site. The transmission of the clock offset reduces the data load on the communications network, which results in a lean information transfer.

Further aspects of the invention, and their advantages, are described in the detailed description below.

BRIEF DESCRIPTION OF THE DRAWINGS

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

DETAILED DESCRIPTION

Figure 1:
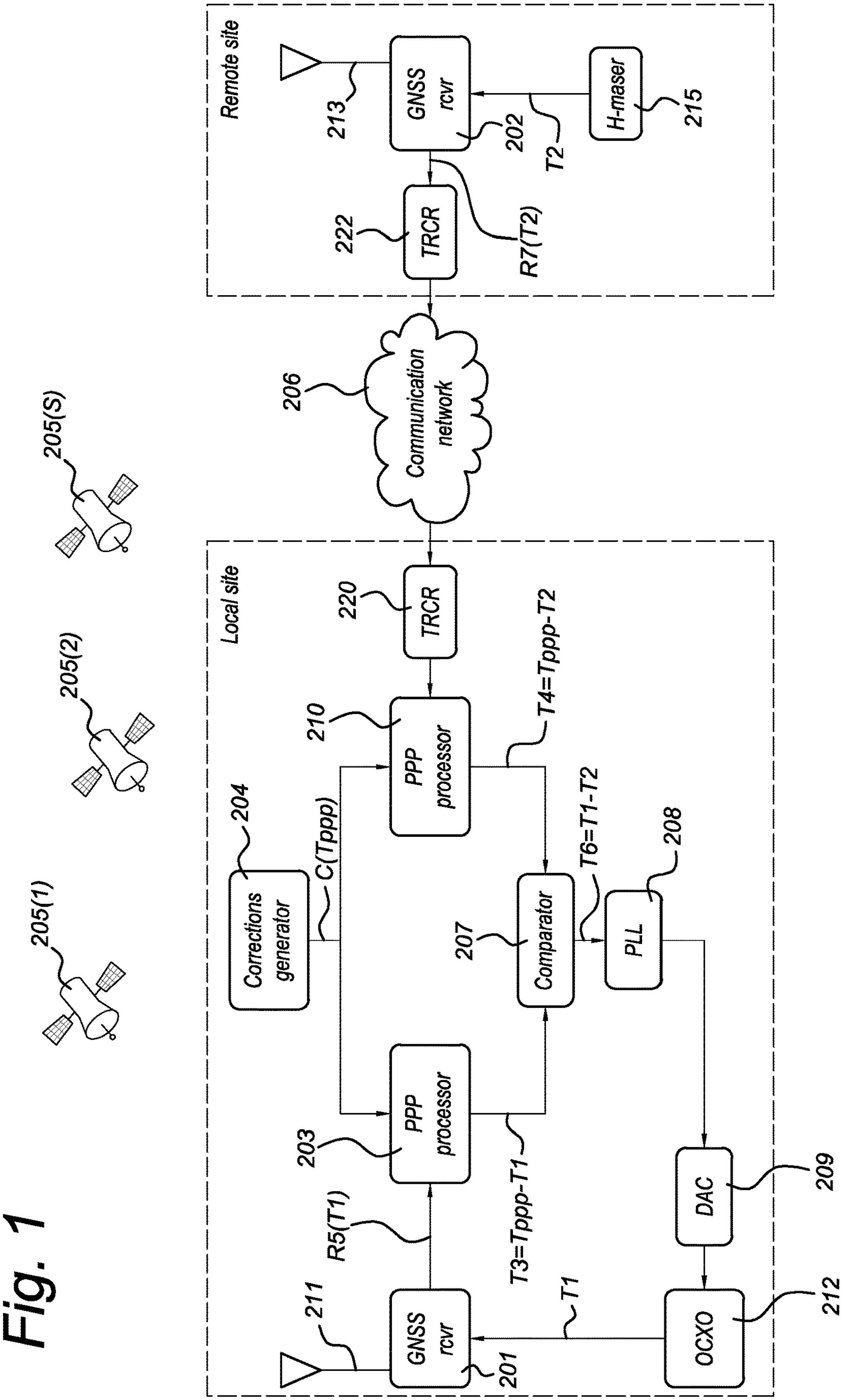
FIG. 1 shows a prior art setup.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for" "having the capacity to" "designed to" "adapted to" "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

A processor is any entity which is capable of processing a parameter. Some examples in the description include a PPP processor, GNSS processor, correction processor etc. These processors may be implemented as software or as a physical device, may be integrated in the claimed system or located in a cloud computing network. Further, the general term PPP used herein may encompass different variants/specifics of the technique, like PPP Real Time Kinematic (PPP RTK), PPP Integer Ambiguity Resolution (PPP IAR), PPP Ambiguity Resolution (PPP AR), etc. A physical processor is typically provided with a Central Processing Unit (CPU, a memory (comprising any desired type of memory including one or more of random access memory, read only memory, programmable memory, etc.). one or more screens (monitors), key boards, mouses, other input devices, printers, etc. may be provided too.

Tppp is a timescale embedded into precise orbit and clock correction signals Cx(Tppp). For the sake of convenience Cx is referred to as "precise orbits and clocks signal" even though it may contain other information like for instance, but not limited to troposphere, ionosphere estimates and UPDs (Uncalibrated Phase Delays) as well. It may also be referred to as a PPP correction signal, as it represents corrections provided to the PPP processor. Tppp may also be a result produced by calculations at any processor, e.g. a GNSS processor. The terms "precise orbit and clock signal" and "PPP correction signal" in FIGS. 2-4, have the same meaning. The term "precise orbit and clock" may further mean any signal that is modified/processed using, or have embedded within, Tppp e.g. Tppp+/−Tx.

The communications network 206 may enable Wi-Fi, 3G, 4G or 5G, or some other (future) form of wired or wireless communication. The wireless communication may include cellular communication which includes at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM). Other standards are not excluded. According to an embodiment of the present invention, the wireless communication may include at least one of, e.g., wireless fidelity (Wi-Fi), Bluetooth, Bluetooth low power (BLE), zigbee, near field communication (NFC), magnetic secure transmission (MST), or radio frequency network. According to an embodiment of the present invention, the wireless communication may include GNSS. The GNSS may be, e.g., global positioning system (GPS), global navigation satellite system (Glonass), or the European global satellite-based navigation system Galileo. The wired connection may include at least one of, e.g., universal serial bus (USB), high definition multimedia interface (HDMI), recommended standard (RS)-232, power line communication (PLC), or plain old telephone service (POTS). The network may include at least one of telecommunication networks, e.g., a computer network (e.g., local area network (LAN) or wide area network (WAN)), Internet, or a telephone network. The communications network can also be configured via satellite communication solutions, whether using geostationary satellites or communication satellites in any other orbit. It can e.g. be a one-way distribution channel from remote server site to the client site. Fugro uses a oneway broadcast from geostationary satellites.

All setups disclosed herein may further comprise a transceiver for transmitting and receiving signals through the communications network.

A client and a server architecture, respectively, as disclosed herein are intended to mean a local and a remote architecture, respectively. The client and server may be separated by distances ranging of a few meters to 1000*s* of kilometers.

For the purpose of determining the extent of protection conferred by the claims of this document, due account shall be taken of any element which is equivalent to an element specified in the claims.

Embodiment 1

Figure 2A:
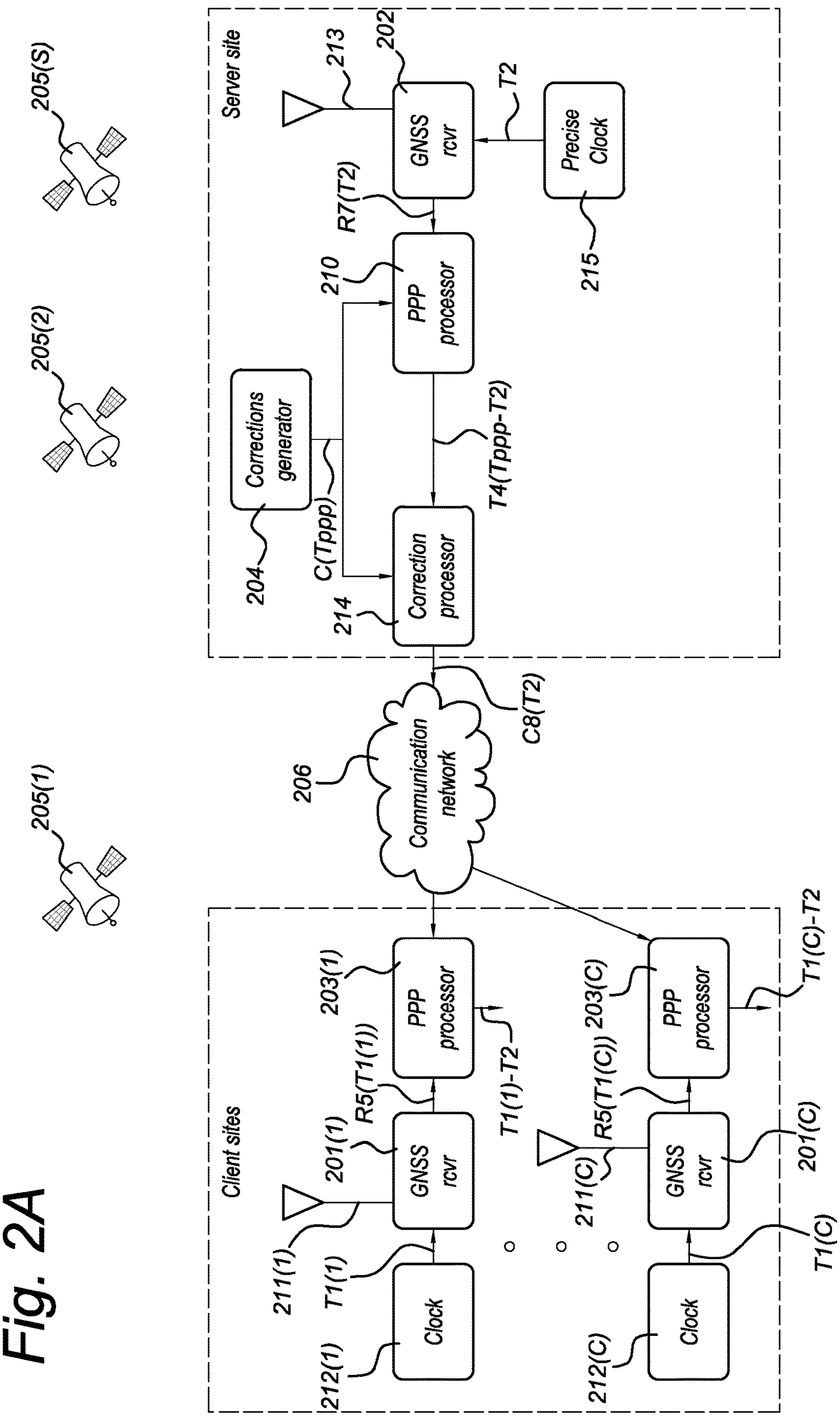
FIG. 2A illustrates a method setup according to the first exemplary embodiment of the invention.

FIG. 2A illustrates a method setup according to the first exemplary embodiment of the invention. The setup comprises at least one client site and a server site.

Client Site(s)

At the client site(s), the method comprises running at least one client GNSS process in a GNSS receiver 201(*c*) (c=1, 2, . . . , C).

A first client site comprises a GNSS receiver 201(1) which is clocked by a clock 212(1) (internal/external). Clock 212(1) is configured to generate a time signal T1(1), which is input to GNSS receiver 201(1). The clock 212(1) may comprise a crystal oscillator, which may be a disciplined oscillator as shown in the prior art setup of FIG. 1. GNSS receiver 201(1) receives signals from at least one satellite, 205(*s*) (s=1, 2, . . . , S) using antenna 211(1). It calculates an output GNSS raw-data signal R5 based on the received satellite signal(s) and the clock signal T1(1), hence indicated in the Figure by R5(T1(1)), and provides R5 to a PPP processor 203(1). T1(1) may be embedded in the measurement data of the GNSS receiver 201(1) transmitted to the PPP processor 203(1).

PPP processor 203(1) may obtain information (e.g. a value) about clock signal T1(1) from this output raw-data signal R5. Processor 203(1) is coupled to communications network 206, and receives an improved correction signal C8(T2) which embeds timescale signal T2 via this network 206. It processes received improved correction signal C8(T2) and raw data signal R5(T1(1)) to generate an improved time signal offset T1(1)−T2.

In case of a plurality of client sites c, a c-th client site comprises a GNSS receiver 201(*c*) with antenna 211(*c*) and clocked by a clock 212(*c*). PPP processor 203(*c*) obtains, using output raw-data signal R5(T1(*c*)) from receiver 201(*c*), the information about time signal T1(*c*) which is generated by the clock 212(*c*). Processor 203(*c*) is coupled to the same communications network 206, and also receives the improved correction signal C8(T2) via this network. It further processes improved correction signal C8(T2) and raw-data signal R5(T1(*c*)) to generate an improved time signal offset T1(*c*)−T2.

PPP processor 203(1), 203(*c*) and any other C−2 PPP processor in the C client sites, may further exchange values of the respective difference signals T1(1)−T2, T1(*c*)−T2, . . . so that each PPP processor 203(1), 203(*c*) can evaluate deviation of its calculated difference signal with the difference signals obtained at other client sites.

The deviation between a first difference signal T1(1)−T2 and any of the c-th difference signal T1(*c*)−T2 may further be analysed by comparing said first difference signal (T1(1)−T2) with said second difference signal (T1(*c*)−T2).

Any of the GNSS receivers 201(*c*) may be implemented by any GNSS receiver setup known from the prior art.

However, the invention is not limited thereto. Also, future implementations may be applied in the setup according to the invention. This applies to all figures of the present invention.

Figure 5:
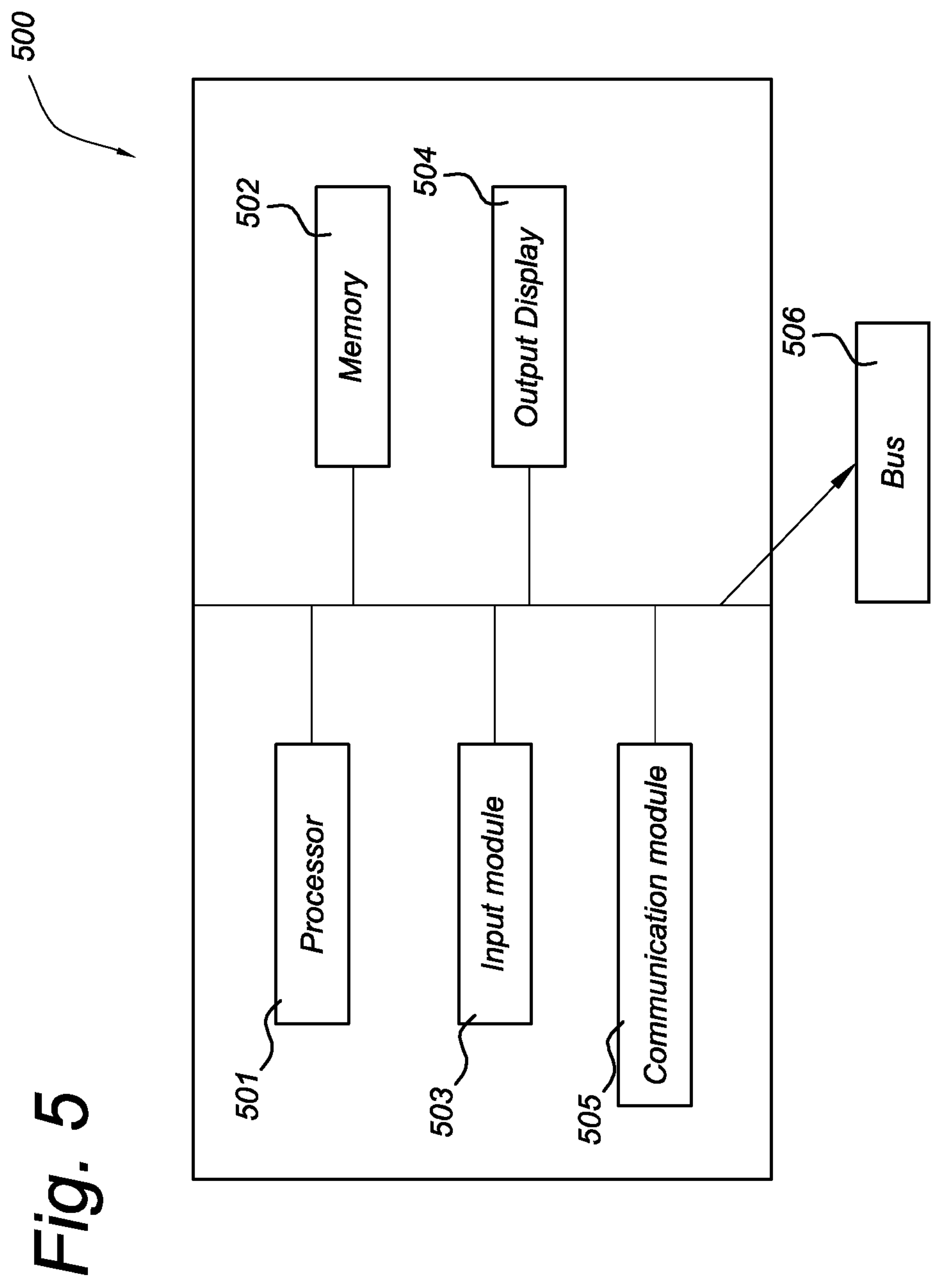
FIG. 5 illustrates a schematic example of a general purpose computer.

PPP processor 203(*c*) may be implemented by any general purpose computer known in the art on which a PPP process is running, by a special purpose computer, or be embedded inside the GNSS receiver firmware. A general setup of such a general computer is shown in FIG. 5.

Server Site

At the server site, the method comprises running a server GNSS process. The method further comprises running a server PPP process and generating a precise orbits and clocks signal (=with improved T2 embedded) which is broadcast to at least one client.

The server site comprises a GNSS receiver 202 with antenna 213 and clocked by a precise clock 215. Clock 215 may be more precise than the clocks 212(*c*) at the client sites, and generates a clock signal T2. It may, for example, be an atomic oscillator, like an H-maser. GNSS receiver 202 is configured to generate an output raw-data signal R7 which incorporates information about the clock signal T2, hence indicated by R7(T2), and a received satellite signal.

R7(T2) is the measurement data of the GNSS receiver 202, also referred to as GNSS raw-data signal or simply raw-data.

At the server site is a PPP processor 210 which receives said output raw-data signal R7 with T2 embedded.

PPP processor 210 is further configured to receive a PPP correction signal, C(Tppp), representing said precise orbit and clock signal.

Each satellite signal comprises an estimated position, and an estimated clock bias for the respective GNSS satellite it was broadcasted from. PPP correction signal C(Tppp) is a time-series of correction values to account for these estimated satellite position orbits and clock biases. C(Tppp) may be provided using an external/internal corrections generator 204. Here, the term "external/internal" indicates a location with reference to the server site. Typically, PPP correction signal C(Tppp) is provided at regular intervals (e.g. 10 seconds) and comprises one full set of correction values for every satellite.

With signals R7(T2) and C(Tppp) as input, PPP processor 210 generates a clock bias signal, or, in other words, a server offset signal T4(Tppp−T2).

T4(Tppp−T2) is input to a correction processor 214. Correction processor 214 also receives the PPP correction signal C(Tppp) from the corrections generator 204. Correction processor 214 then generates C8 (with an improved timescale T2) by replacing the PPP timescale signal Tppp with the server offset signal T4. C8 may therefore be regarded as a precise orbits and clocks signal C(Tppp), in which the timescale of clock signal T2 is embedded, hence indicated by C8(T2). The corrections processor 214 subtracts the offset signal T4 from the precise clock correction values from each satellite that is embedded in C(Tppp). If the difference between C(Tppp) and T4 is below a predetermined threshold, no further corrections may be required. However, If the difference between the c(Tppp) and offset signal T4 is above this predetermined threshold, then additional corrections may be done when changing the timescale of the clocks. Per example, a GNSS satellite travels at roughly 4 km/s and the time it takes the satellite to move a millimetre can for instance be defined as the threshold for when the additional measures need to be taken. In this example the threshold becomes 250 ns. If the offset signal T4 is above this limit, the timescale of the combined precise orbit coordinates may be shifted by an amount that compensates for said clock offset. Alternatively, the precise orbit coordinates may be recalculated with the correct/offset clock timescale.

So, the process as performed by the correction processor 214 can be summarized as follows. The correction process determines whether the clock offset caused by the combined precise orbits and clocks timescale offset signal T9(Tppp−T2) exceeds a predetermined threshold value; and, if so, it corrects for the clock offset so that the orbits and clocks remain constant, for instance, by either:

- shifting the timestamp of the combined precise orbit coordinates by an amount that compensates for said clock offset; or
- recalculating the precise orbit coordinates at the offset clock timescale.

C8(T2) is then transmitted via communications network (206) to each client site.

Each one of the PPP processor 210 and the correction processor 214 may be implemented by a distinct general purpose computer as shown in FIG. 5. However, in an embodiment, correction processor 214 and PPP processor 210 may be implemented by a single computer, in which case the generation of T4(Tppp−T2) and generation of C8(T2) are performed by the same entity.

As mentioned, PPP processor 203(*c*) at client site c processes R5(T1(*c*)) and C8(T2) to obtain T1(*c*)−T2.

Figure 2B:
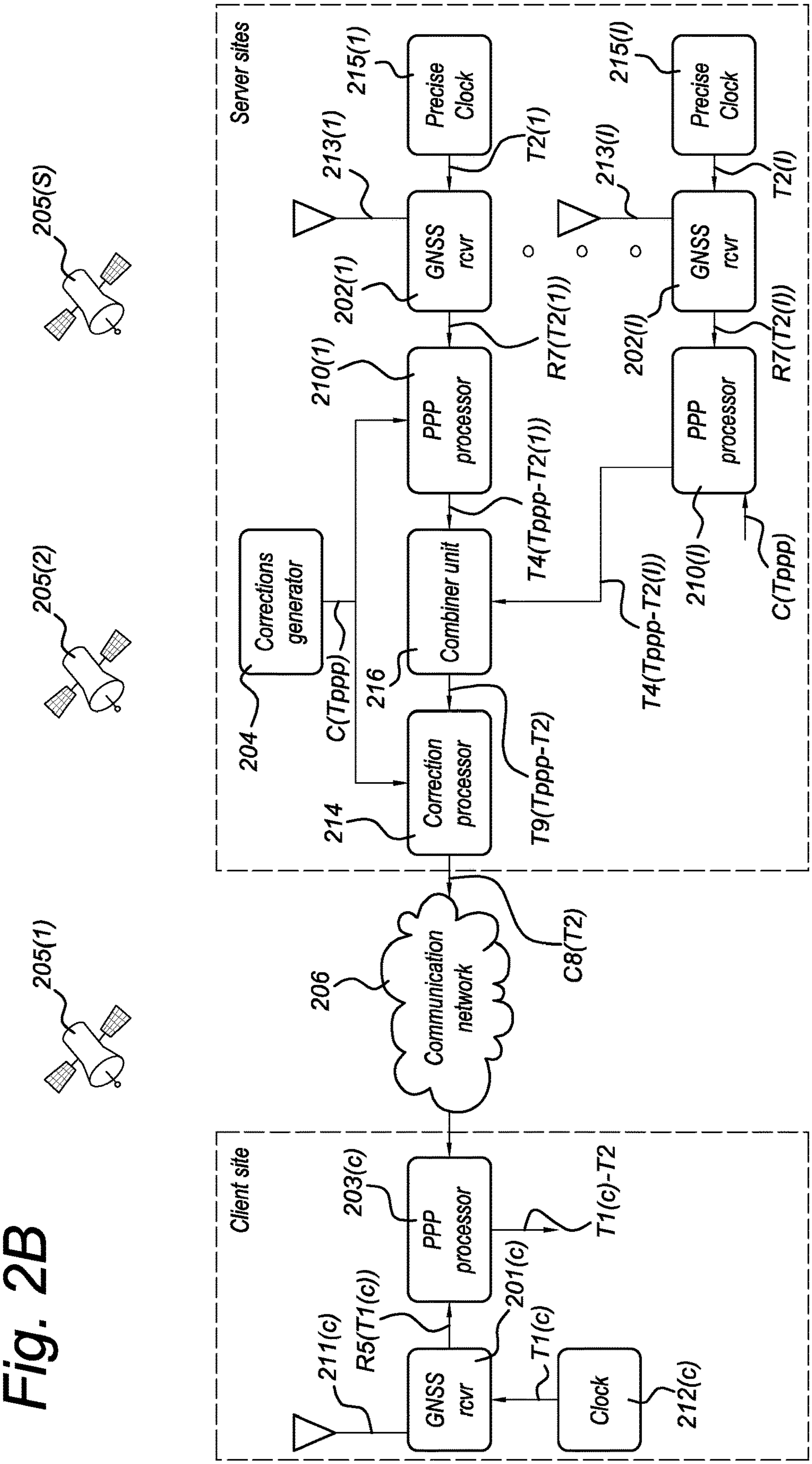
FIG. 2B illustrates another method setup according to the first exemplary embodiment of the invention.

FIG. 2B illustrates another method setup according to the first exemplary embodiment of the invention. The setup comprises at least one client site and a plurality of server sites.

Client Site

The implementation is the same as that at the client site(s) described as part of FIG. 2A setup.

Server Sites

The server sites may comprise a primary site and at least one secondary site. In addition to a GNSS receiver 202(1) with antenna 213(1) clocked by precise clock 215(1), a PPP processor 210(1), a corrections generator 204 and correction processor 214, as in the server setup already described as part of FIG. 2A, the primary server site may further comprise a combiner unit 216.

The secondary sites comprise GNSS receiver 202(*i*) (i=1, 2, . . . , I) with antenna 213(*i*) clocked by precise clock 215(*i*), and a PPP processor 210(*i*). Each PPP processor 210(*i*) receives PPP correction signal, C(Tppp), representing said precise orbit and clock signal. C(Tppp) may be provided using said at least one external/internal corrections generator 204. Each PPP processor 210(*i*) generates a clock bias, in other words, a server offset signal T4=Tppp−T2(*i*).

Combiner unit 216 at the primary site acts as an intermediate unit between correction processor 214 and PPP processor 210(1). Assuming I number of server sites, the combiner unit 216 is configured to receive server offset signals T4=Tppp−T2(*i*) (i=1, 2, . . . , I) from PPP processors 210(1), . . . 210(I) of the primary site and the I−1 secondary sites. The T4(Tppp−T2) output signals from the secondary server sites may be received via broadcast transmission and/or via any suitable telecommunication network.

In an embodiment, the combiner unit 216 runs a process that may combine the signals from several different clocks weighted in a statistically optimal way. The combiner unit 216 may take into account the different short- and long-term performance of each clock signal to be combined. For instance, some clocks 215(*i*) may have relatively poor short-term performance while great long performance, for other clocks 215(*i*) the situation may be the opposite. A person skilled in the art will know how to implement such a combiner unit 216 in order to output a best possible composite clock or ensemble time. Combiner unit 216 receives output signals T4(Tppp−T2(*i*)) from all PPP processors 210(*i*) at the different server sites, and generates a combined server offset signal T9(Tppp−T2). T9 may be regarded as a correction to the precise orbits and clocks timescale Tppp, in which the timescale of clock signal T2 is embedded. Unit 216 may be positioned at any of the I server sites (e.g. a primary server site), in which case signals T4 from other I−1 server sites are routed to the primary site. Alternately, unit 224 may be situated away from all server sites, in which case signals T4(Tppp−T2) from all server sites may be transmitted to a remote site which houses unit 216

In an embodiment, combiner unit 216 may also be disposed outside the primary server site, e.g. in a cloud computing system. In this case, the T4(Tppp−T2(*i*)) signals are transmitted to combiner unit 216 from all PPP processors 210(*i*), including PPP processor 210(1) of the primary server site.

Combined server offset signal T9(Tppp−T2) is input to correction processor 214, along with C(Tppp) from the corrections generator 204. If combiner unit 216 is located outside the primary site (or any other server site), T9(Tppp−T2) is transmitted to correction processor 214. Such transmission may be via any suitable telecommunication network. It may be a broadcast.

Correction processor 214 generates C8 (with an improved timescale T2) by modifying the PPP correction signal C(Tppp) with the combined server offset signal T9(Tppp−T2). As in FIG. 2A, C8(T2) may therefore be regarded as a precise orbits and clocks signal, in which the timescale of clock signal T2 is embedded.

C8 is then broadcasted via a communications network 206 to each client site.

PPP processor 203(*c*) at each client site c processes R5(T1(*c*)) and C8(T2) to obtain T1(*c*)−T2. This is similar to the setup of FIG. 2A.

The combination of clock biases from multiple PPP processors help achieve a more stable T9(Tppp−T2) which will result in C8(T2) with improved timescale T2. The timescale T2 is more stable than Tppp because of the assumption that Tppp is defined without using high-end oscillators. When generating orbit and clock corrections for positioning and navigation purposes this assumption is normally the case since the stability of the timescale has no impact on such applications.

Each one of the PPP processors 210(*i*) and the correction processor 214 may be implemented by a distinct general purpose computer as shown in FIG. 5, However, in an embodiment, correction processor 214 and PPP processor 210(1), may be implemented by a single computer, in which case the generation of T4(Tppp−T2(1)) and generation of T8 are performed by the same entity.

It is also possible to collect the R7(T2(*i*)) data from the different GNSS receivers 202(*i*) at the different server sites by one or more PPP processors at any site There may be practical reasons for choosing to do so if communication lines are robust and have high capacity, even though it would require less data capacity and it is more robust to do the above. Furthermore, the PPP processors 202(*i*), correction processor 214, and/or combiner unit 216, may be collocated or non-collated.

Embodiment 2

Figure 3A:
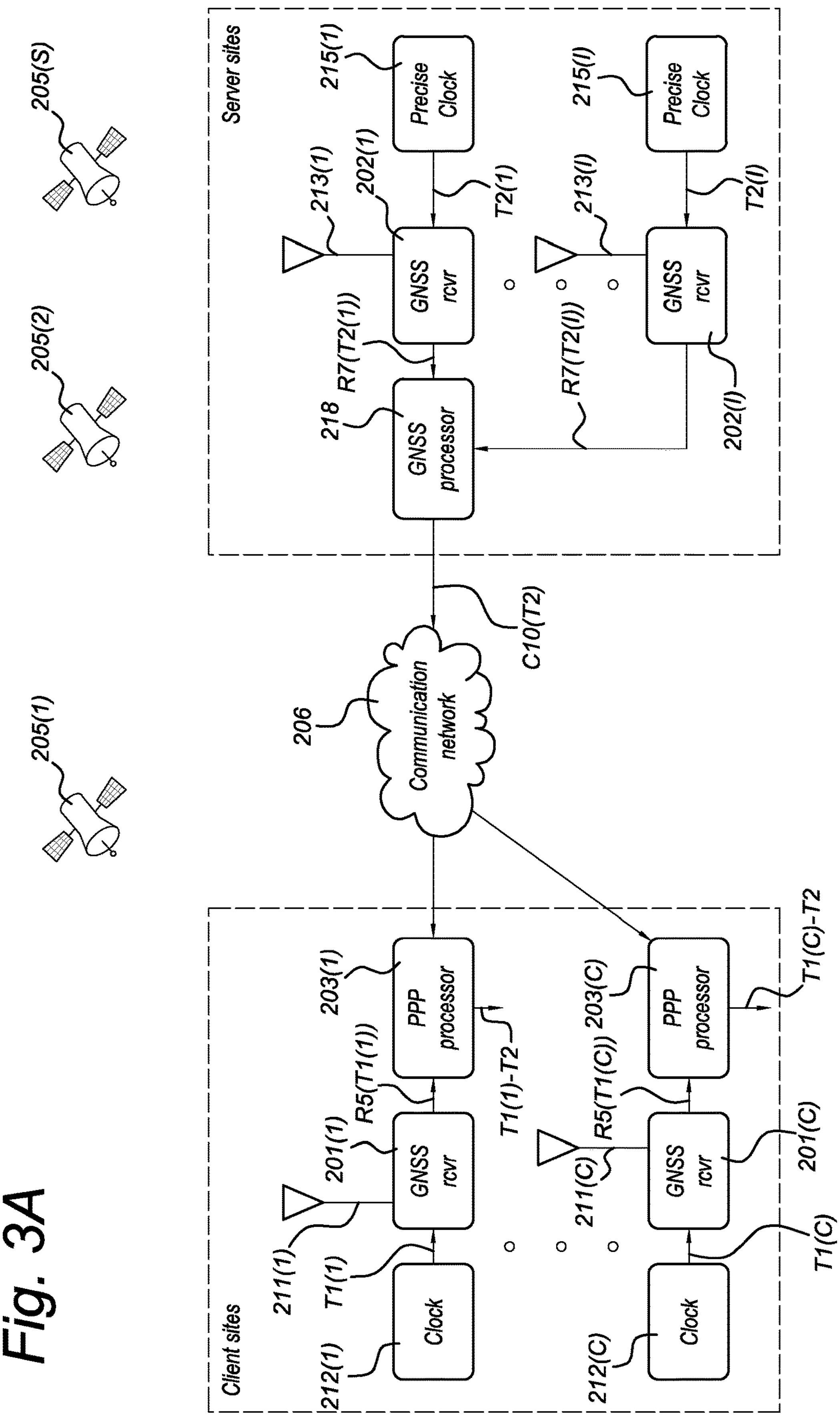
FIG. 3A illustrates a method setup according to the second exemplary embodiment of the invention.

FIG. 3A illustrates a method setup according to the second exemplary embodiment of the invention.

As in the FIGS. 2A, 2B embodiment, the setup may comprise one or more server sites. Each server site may be configured to receive raw-data signals from a plurality of geographically distributed GNSS receivers 202(*i*) (e.g. 25-50, preferably 50-100, more preferably more than 100). These receivers 202(*i*) may be ground reference stations which collect satellite data from satellites 205(*s*). The GNSS receivers 202(*i*) may be clocked locally by a low precision local oscillator or a high precision clock 215(*i*). In this embodiment, at least one of said receiver 202(*j*) is clocked by a high precision clock. A plurality of globally distributed GNSS receivers 202(*i*) (ground reference stations) may be used for an improved method performance. In case of a plurality of server sites, the server sites may themselves be globally distributed.

FIG. 3A shows an example where the setup comprises a server site comprising I number of GNSS receivers 202(*i*), where each receiver 202(*i*) is clocked using a respective precise clock 215(*i*), and at least one client site.

Client Site

At the client site(s), the method comprises running a client GNSS process, the implementation of which is the same as that at the client site(s) described as part of FIG. 2A or FIG. 2B setups.

Server Site

FIG. 3A shows I GNSS receivers 202(*i*) with antennae 213(*i*), each clocked by a precision clock 215(*i*). Precision clocks 215(*i*) generate clock signals T2(*i*), respectively.

The method comprises running a server GNSS process. The method further comprises calculation of a precise orbits and clocks signal C10 with timescale T2 and broadcasting it.

Each GNSS receiver 202(*i*) generates an output GNSS raw-data signal R7(T2(*i*)), each R7(T2(*i*)) embedding information about the respective GNSS receiver precise clock T2(*i*).

GNSS processor 218 receives signals R7(T2(*i*)) from the respective I GNSS receivers and calculates precise orbit and clock signal C10(T2). The precise clock information or timescale T2 is embedded in the calculated precise orbits and clocks signal T10(T2).

GNSS processor 218 then broadcasts C10(T2) to each client site via communications network 206, where it is received and processed by PPP processor 203(*c*). Thus, in the embodiment of FIG. 3A, the PPP processors 203(*c*) do not receive a separate time signal Tppp−T2 but receive only an improved correction signal C10(T2) from a server site.

The GNSS processor may be implemented by a general purpose computer as shown in FIG. 5.

Figure 3B:
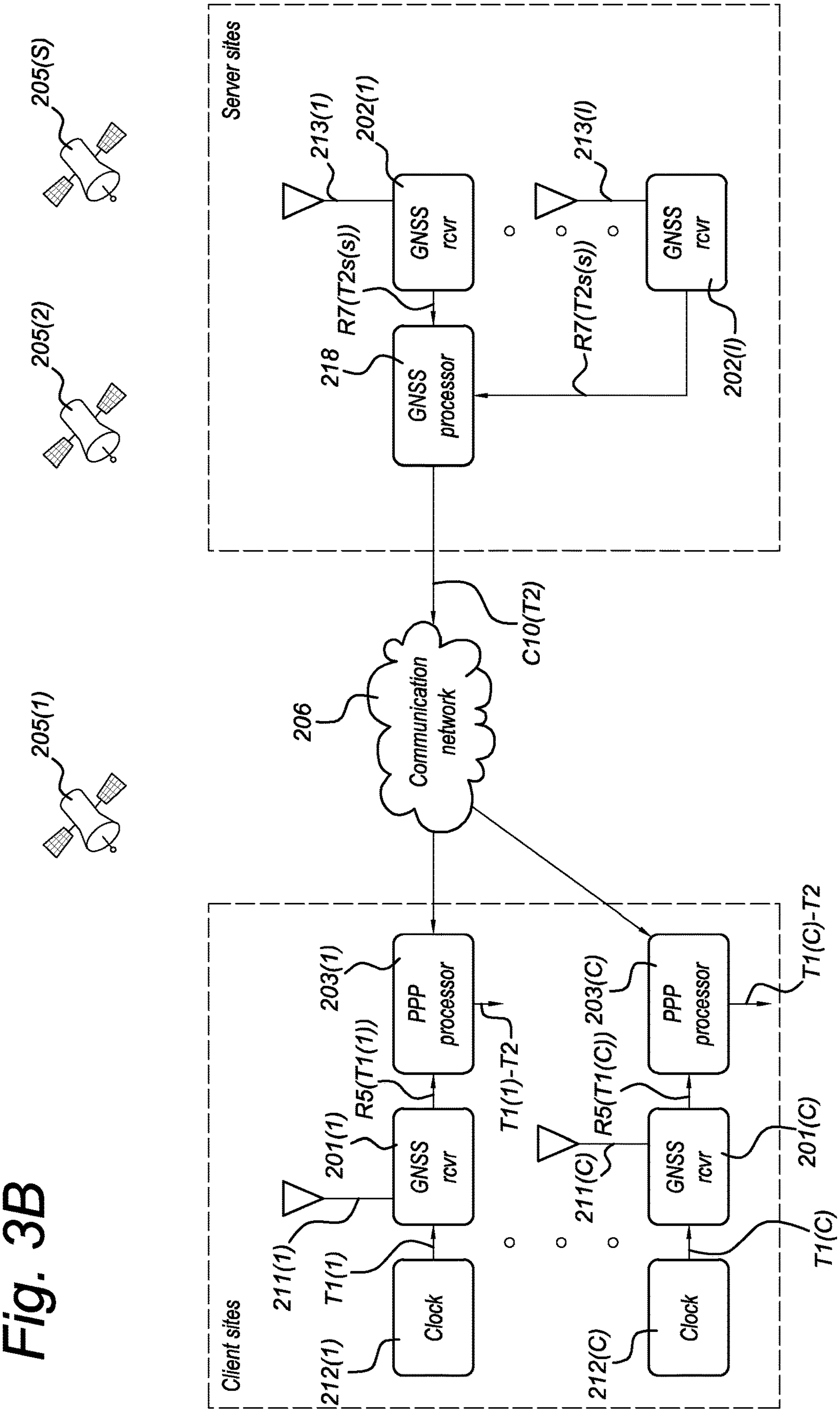
FIG. 3B illustrates another method setup according to the second exemplary embodiment of the invention.

FIG. 3B illustrates another method setup according to the second exemplary embodiment of the invention.

Client Site

The implementation is the same as that at the client site(s) described as part of FIG. 2A or FIG. 2B or FIG. 3A setups.

Server Site

The server site differs from that of FIG. 3A in that instead of embedding information of a precision clock 215(*i*) of the GNSS receiver 202(*i*), the method uses the internal satellite, 205(1), 205(2) . . . 205(S), clock information to calculate the precise orbit and clock signal.

In FIG. 3B, each satellite 205(*s*) has its internal precise clock (not shown) which generates a satellite clock signal T2*s*(*s*) to provide timing information about when the satellite 205(*s*) transmits a radio signal. Each GNSS receiver 202(*i*) generates a raw-data signal R7 based on satellite radio signals received from satellites 205(*s*) and embeds inherent time signal T2*s*(*s*) associated with the satellite clock(s) in its measurement data, and transmits a corresponding output signal R7(T2*s*(1) . . . T2*s*(*s*)) to GNSS processor 218. The satellite clock information T2*s*(*s*) is then extracted by GNSS processor 218 from R7(T2*s*(*s*) when calculating the precise orbit and clock signal C10(T2). The extracted precise clock information T2 is embedded in the calculated C10(T2). C10, or the precise orbits and clock signal, is broadcast to each client site via communication network 206.

GNSS processor 218 generates precise orbits and clocks for real-time use based on GNSS reference station data as input. Such a processor is well known to a person skilled in the art and many different implementations exist. The Real Time GIPSY (GNSS Inferred Positioning System) developed by JPL NASA (Jet Propulsion Laboratory National Aeronautics and Space Administration) in the USA is an example of such an implementation. For instance, the GNSS processor 218 can be implemented in one Kalman filter where both the satellite orbit positions and clock offsets are estimated real-time. Otherwise, the orbits can be estimated with a least-squares process that runs in, for instance hourly, batches. This results in orbit predictions, while the clock offset can for instance be calculated using the predicted orbits, reference station coordinates and the same GNSS reference station data as input. The orbit and clock calculations are advanced processes that involve many different inputs, models and estimates of many different variables. The models and inputs may for instance include solid earth tide, ocean loading, earth rotation and orientation, satellite solar pressure models, satellite attitude models, relativistic effects, etc. The estimated parameters may for instance include adjustments to known reference station coordinates, receiver and satellite signal biases, troposphere delays at each reference station, reference station clock offsets, ionospheric delays, satellite orbits and satellite clock offsets.

It is therefore possible to implement a precise timescale T2 using GNSS observations only, without having precise clocks 215(*i*) at each reference station (GNSS receiver). Like in the embodiment of FIG. 3A, the PPP processors 203(*c*) do not receive a separate correction signal C1(Tppp) but receive an orbit and clock signal with improved timescale C10(T2) from a server site.

The GNSS processor may be implemented by a general purpose computer as shown in FIG. 5.

Embodiment 3

Figure 4A:
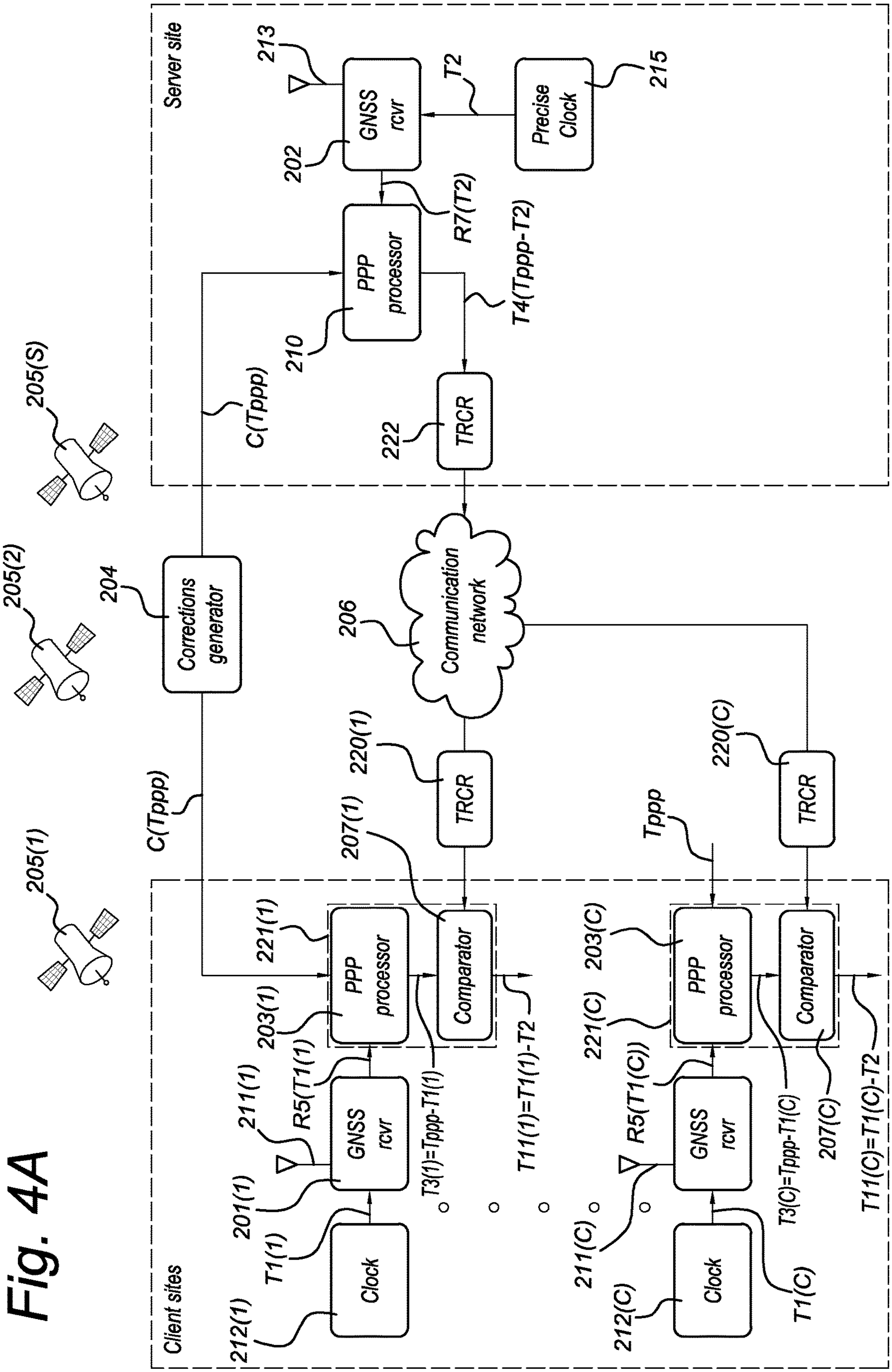
FIG. 4A illustrates a method setup according to the third exemplary embodiment of the invention.

FIG. 4A illustrates a method setup according to the third exemplary embodiment of the invention. The setup comprises at least one client site and a server site.

In the embodiment, the improved time signal T2 is a clock bias estimate T4 which is generated by calculating the difference between the precise orbit and clock timescale Tppp and the clock signal T2 of the precise clock 215 at the server site.

Client Site

At the client site(s), the method comprises running at least one client GNSS process.

A first client site comprises GNSS receiver 201(1) with antenna 211(1) clocked by clock 212(1). Clock 212(1) generates clock signal T1(1). The output raw data signal R5 of GNSS receiver 201(1), which comprises information about this clock signal T1(1), is input to PPP processor 203(1).

PPP processor 203(1) also receives a PPP correction signal, C(Tppp), from corrections generator 204. The corrections generator 204 may be situated internal to the setup, or external to it, e.g. as part of a cloud computing network. PPP processor 203(1) then calculates the difference between Tppp and the extracted T1(1) to generate T3(1)=Tppp−T1(1).

The first client site further comprises a comparator 207(1), which is configured to receive T3(1) from PPP processor 203(1). In FIG. 4A, entities PPP processor 203(1) and comparator 207(1) are shown integrated in a single PPP processor module 221(1). In an embodiment, entities 203(1) and 207(1) may be disposed in separate modules. Further, they may exist in a software and/or hardware implementation, e.g. the one shown in FIG. 5.

Comparator 207(1) is coupled to a transceiver 220(1) which is connected to communications network 206. It receives T4(Tppp−T2), a clock signal which is the difference between the precise orbit and clock timescale and the more precise clock signal T2, from the server site via said network 206 and transceiver 220(1).

Comparator 207(1) generates a difference time signal T11(1)=T3(1)−T4=T1(1)−T2.

In an embodiment, it is possible to change the order of the processes inside PPP processor module 221(1) such that the signal T4(Tppp−T2) is used as an input together with C(Tppp) and R5(T1(1)) into PPP processor 203(1) so that T11(1) is output directly from PPP processor 203(1). This example can be understood as having a corrections processor (not shown) in front of PPP processor 203(1) replacing the comparator 207 and located at the client site.

In an embodiment, the setup comprises a plurality of C client sites.

For example, a c-th client site comprises a GNSS receiver 201(*c*) with antenna 211(*c*) and clocked by a clock 212(*c*). PPP processor 203(*c*) obtains, using output raw-data signal R5(T1(*c*)) from receiver 201(*c*), the information about time signal T1(*c*) which is generated by the clock 212(*c*).

PPP processor 203(*c*) also receives the PPP correction signal, C(Tppp), using the corrections generator 204. PPP processor 203(*c*) then calculates the difference between Tppp and T1(*c*) to generate T3(*c*)=Tppp−T1(*c*).

Comparator 207(*c*) receives T3(*c*) from PPP processor 203(*c*), and is coupled to a transceiver 220(*c*) which is connected to communications network 206. It receives the clock signal T4(Tppp−T2) via this network. It further differences the input time signals to generate an improved time signal offset T11(*c*)=T1(*c*)−T4=T1(*c*)−T2. Signal T4, the difference between the precise orbit and clock timescale Tppp and the more precise clock signal T2, may therefore be regarded as a correction to the Tppp timescale.

Comparators 207(1), 207(*c*) and/or any other c−2 comparator among the c client sites, may further exchange values of the respective difference signals T11(1)=T1(1)−T2, T11(*c*)=T1(*c*)−T2, . . . so that each comparator 207(1), 207(*c*) can evaluate deviation of its calculated difference signal with the difference signals obtained at other client sites.

Server Site

At the server site, the method comprises running a server GNSS process. The method further comprises running a server PPP process and generating a timescale correction signal T4 including the improved T2 signal which is broadcast to one or more clients.

Like embodiment 1, FIGS. 2A, 2B, this embodiment involves running a PPP process at the server site. The server site comprises a GNSS receiver 202 with antenna 213 and clocked by precise clock 215. Clock 215 generates a clock signal T2. It may, for example, be an atomic oscillator, like H-maser. GNSS receiver 202 is configured to generate output raw-data signal R7(T2) which incorporates information about the clock signal T2 and one or more received satellite signals. Raw-data R7(T2) is the measurement data of the GNSS receiver 202.

The server site further comprises PPP processor 210 which receives said raw data signal R7(T2) and extracts T2 out of R7(T2). PPP processor 210 is further configured to receive the PPP correction signal, Tppp, from the corrections generator 204. Corrections generator 204 may, again, be internal or external to the server site. PPP processor 210 generates a Tppp timescale correction signal, in other words, a server offset signal T4(Tppp−T2) which is Tppp−T2.

In the embodiment, the timescale offset signal T4 is calculated to be a correction to Tppp embedded inside the precise orbit and clock signal.

PPP processor 210 is coupled to a transceiver 222, which broadcasts T4(Tppp−T2) via communications network 206.

Figure 4B:
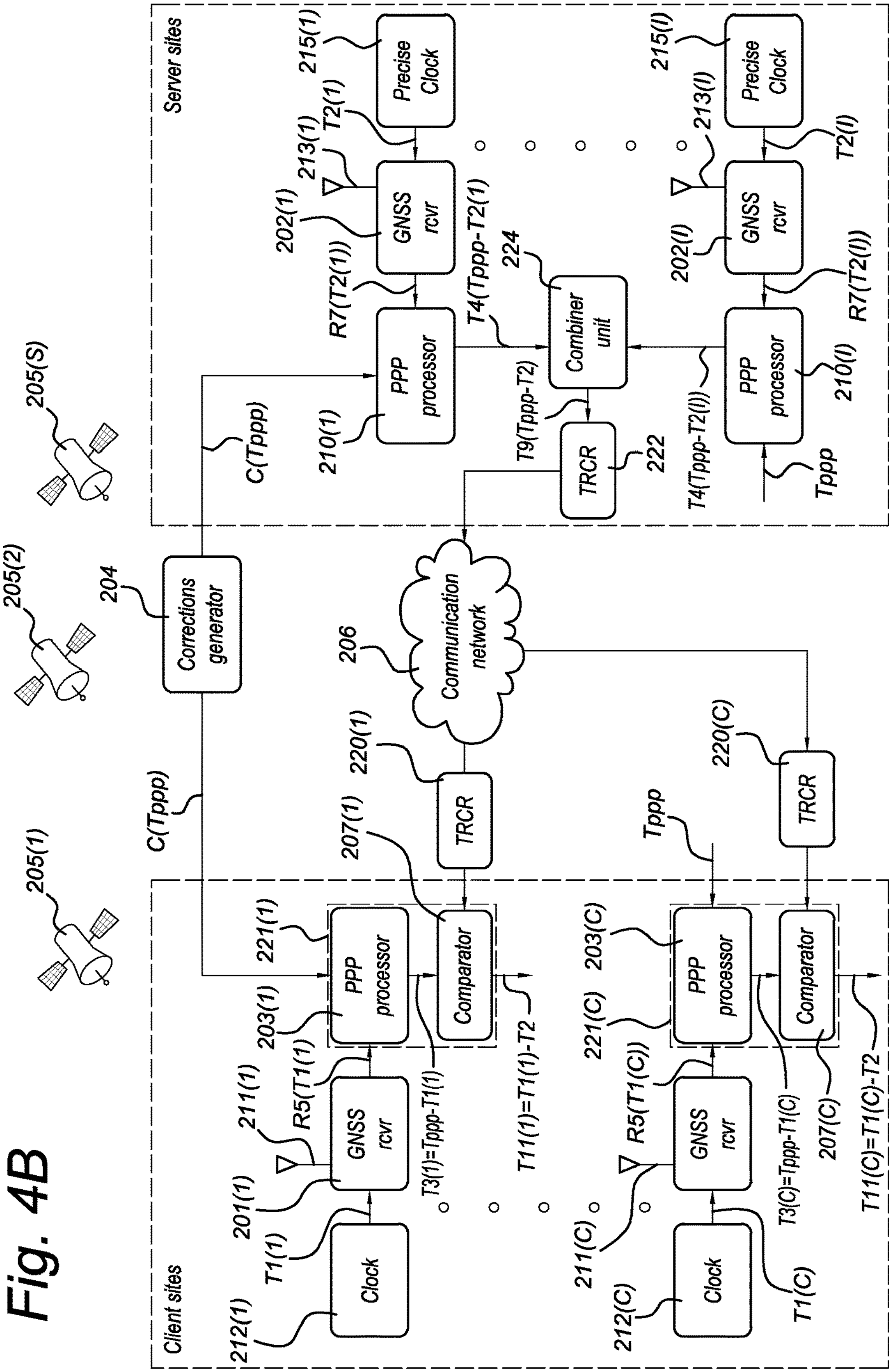
FIG. 4B illustrates another method setup according to the third exemplary embodiment of the invention.

FIG. 4B illustrates another method setup according to the third exemplary embodiment of the invention. The setup comprises at least one client site and a plurality of server sites.

Client Site

The method and implementation of the setup at the client site are the same as that described in the description of FIG. 4A.

Server Sites

Assuming I server sites, each server site comprises GNSS receiver 202(*i*) with antenna 213(*i*) and clocked by a precise clock 215(*i*) generating a clock signal T2(*i*). GNSS receiver 202(*i*) is configured to generate an output raw-data signal R7(T2(*i*)) which incorporates information about the clock signal T2(*i*) and one or more received satellite signals. T2 is embedded in the measurement raw-data of the GNSS receiver 202(*i*).

As in FIG. 4A, the server site further comprises PPP processor 210(*i*) which receives said GNSS raw-data signal R7(T2(*i*)). PPP processor 210(*i*) is further configured to receive the PPP correction signal C(Tppp) from corrections generator 204. PPP processor 210(*i*) then generates the server offset signal T4(Tppp−T2(*i*)).

Corrections generator 204 provides the same PPP correction signal C(Tppp) to all PPP processors 210(*i*).

The setup further comprises a combiner unit 224. The combiner unit 224 runs a process that may combine the signals from several different clocks weighted in a statistically optimal way. The combiner unit 224 may take into account the different short- and long-term performance of each clock signal to be combined. For instance, some clocks 215(*i*) may have relatively poor short-term performance while great long performance, for other clocks 215(*i*) the situation may be the opposite. A person skilled in the art will know how to implement such a combiner unit 224 in order to output a best possible composite clock or ensemble time. Combiner unit 224 receives output signals T4(Tppp−T2(*i*)) from all PPP processors 210(*i*) at the different server sites, and generates a combined server offset signal T9(Tppp−T2). T9 may be regarded as a correction to the precise orbits and clocks timescale Tppp, in which the timescale of clock signal T2 is embedded. Unit 224 may be positioned at any of the I server sites (e.g. a primary server site), in which case signals T4 from other I−1 server sites are routed to the primary site. Alternately, unit 224 may be situated away from all server sites, in which case signals T4(Tppp−T2) from all server sites may be transmitted to a remote site which houses unit 224.

Combiner unit 224 is coupled to transceiver 222 which transmits the server offset signal T9, which can be seen as the correction to achieve the modified precise orbit and clock timescale, via communications network 206 to each client site.

In all embodiments, clock 212(*c*) may comprise cheap crystal oscillators. The difference signal T1(*c*)−T2 may be input to each of these oscillators via a feedback loop. The feedback loop may comprise a PLL and a DAC, as shown in FIG. 1. Details are omitted as they are known to a skilled person.

As a result of the precise and stable T2, and hence T1−T2, the difference signal can be used to discipline the oscillators in a very accurate manner.

Like in FIG. 2B, it is also possible to collect the R7(T2(*i*)) data from the different GNSS receivers 202(*i*) at the different server sites by a single PPP processor located at the primary server site. I.e., then all the PPP processors 202(*i*) and combiner unit 224 are collocated. There may be practical reasons for choosing to do so if communication lines are robust and have high capacity, even though it would require less data capacity and it is more robust to do the above.

Now some summarising statements are made.

According to an aspect of the invention, a client GNSS apparatus setup for receiving a disseminated timescale T2 according to embodiments 1 and 3 comprises at least one GNSS receiver 201(*c*), at least one PPP processor 203(*c*) and at least one clock 212(*c*). Each GNSS receiver 201(*c*) is configured to generate a client GNSS output raw-data signal R5 based on a client clock signal T1(*c*) and based on one or more satellite signals. The client clock signal T1(*c*) is generated by clock 212(*c*). Each PPP processor 203(*c*) is one-to-one coupled with each GNSS receiver 203(*c*), and is configured to receive a precise orbits and clocks signal. This precise orbits and clocks signal corresponds to signals C8(T2) in embodiment 1 and C(Tppp) in embodiment 3.

The PPP processor 203(*c*) then generates a difference signal (T1(*c*)−T2) between said client clock signal T1(*c*) and a timescale signal T2 based on said client GNSS output raw-data signal R5(T1(*c*)) and said precise orbits and clocks signal.

In embodiment 3, the PPP processor 203(*c*) is further configured to receive a PPP correction signal C1(Tppp) and generate a clock offset signal T3(*c*) between said PPP timescale Tppp and said client clock signal T1(*c*). Said difference signal T11(*c*) is obtained by comparing said PPP clock offset signal T3(*c*) and said timescale correction signals T4(Tppp−T2) or T9(Tppp−T2). This may be done by the PPP processor 203(*c*) or a separate comparator 207(*c*). The PPP processor 203(*c*) and the comparator 207(*c*) may form a single entity 221(*c*) or may be distributed. PPP correction signal C1(Tppp) is provided via an internal or external correction generator 204.

In embodiment 3, a time signal offset, Tppp−T2, is received by the client over the communications network. This decreases the data load on communications network 206, because data relating to T9(Tppp−T2) is significantly less than GNSS raw-data R7(T2) (as is broadcast in the prior art shown in FIG. 1) and will furthermore result in a more satisfactory analyses, even if an interruption in data transfer occurs between the client and the server setups, or in case of a temporary network shut-down.

In both embodiments, clock 212(*c*) may comprise a disciplined oscillator which is configured to produce said client clock signal T1(*c*) based on said difference signal T1(*c*)−T2, the latter used as a feedback signal.

In both embodiments, the PPP processor 203(*c*) may be configured to exchange (e.g. via a transceiver) the generated difference signal T1(*c*)−T2 with another client GNSS setup. A PPP processor 203(1) of a first client GNSS setup can thus compare the generated difference signal T1(1)−T2 with a difference signal T1(2)−T2 generated by a PPP processor 203(2) of a second client GNSS setup. Such comparisons between many time signals may for instance used to define an ensemble timescale like for instance TAI (Temps Atomique International) or UTC (Coordinated Universal Time).

According to another aspect of the invention, a server GNSS apparatus setup for dissemination of a timescale signal T2 according to embodiments 1 and 3 comprises at least one GNSS receiver 202 and at least one processor, e.g. PPP processor 210. Each GNSS receiver 202 is configured to generate a server GNSS output raw-data signal R7 based at least on one or more satellite signals and based on a precise server clock signal T2. The processor is configured to receive a PPP correction signal C1(Tppp) from an internal/external corrections generator 204. It generates a server offset signal T4(Tppp−T2) based on said server GNSS output raw-data signal R7 and the PPP correction signal C1(Tppp). The processor generates a precise orbits and clocks timescale offset signal T4(Tppp−T2). This timescale offset signal corresponds to T4(Tppp−T2) or T9(Tppp−T2) in embodiment 3. In embodiment 1 C8(T2) contains the improved timescale signal T2 inside the precise orbits and clocks.

In embodiment 1, the processor may be separately disposed as a PPP processor 210 and a correction processor 214. Correction processor 214 and PPP processor may form part of a single processor entity, or separate, as shown in FIG. 2A or 2B. PPP processor 210 receives a PPP correction signal C1(Tppp) from an internal/external corrections generator 204. It generates the timescale correction signal T4(Tppp−T2) based on said server GNSS output raw-data signal R7(T2) and the PPP correction signal C1(Tppp). Correction processor 214 then generates a precise orbits and clocks signal C8(T2) based on said server offset signal T4(Tppp−T2) and the PPP correction signal C1(Tppp) received from the corrections generator 204.

In both embodiments, the processor may further comprise a combiner unit 216 which combines a plurality of timescale offset signals T4(Tppp−T2(*i*)) from PPP processors of another server GNSS setup, before inputting the result to the correction processor 214. The combiner unit 216 may also be located externally, e.g. in a cloud computing system.

The server GNSS setup further comprises a transceiver to broadcast said precise orbits and clocks signal offset signal e.g. T4(Tppp−T2) or precise orbits and clock signal C8(T2) via a telecom network 206.

Further, according to an aspect of the invention, a client GNSS apparatus setup for receiving a disseminated timescale T2 according to embodiment 2 comprises at least one GNSS receiver 201(*c*), at least one PPP processor 203(*c*) and at least one clock 212(*c*). Each receiver is configured to generate a client GNSS output raw-data signal R5(T1(*c*)) based on a client clock signal T1(*c*) and based on one or more second satellite signals. The client clock signal T1(*c*) corresponds to a clock signal generated by the clock 212(*c*).

Each PPP processor 203(*c*) is one-to-one coupled with each GNSS receiver 203(*c*). The PPP processor is configured to receive the GNSS output raw-data signal R5(T1(*c*)) and a precise orbits and clocks signal C10(T2), extract a timescale signal T2 and calculate a difference signal T1(*c*)−T2 between said client clock signal T1(*c*) and timescale signal T2. The GNSS output raw-data signal R5(T1(*c*)) is provided by the GNSS receiver 201(*c*), and the precise orbits and clocks signal C10(T2) is obtained from a server via a communications network 206.

Clock 212(*c*) may comprise a disciplined oscillator 212(*c*) which is configured to produce said client clock signal T1(*c*) based on said difference signal T1(*c*)−T2, by using it as a feedback signal.

Further, the PPP processor 203(*c*) may be configured to exchange (e.g. via a transceiver) the generated difference signal (T1(*c*)−T2) with another client GNSS setup. A PPP processor 203(1) of a first client GNSS setup can then compare the generated difference signal (T1(1)−T2) with a difference signal T1(2)−T2 generated by a PPP processor 203(2) of a second client GNSS setup. Such comparisons between many time signals may for instance used to define an ensemble timescale like for instance TAI (Temps Atomique International) or UTC (Coordinated Universal Time).

According to another aspect of the invention, a server GNSS apparatus setup for dissemination of a timescale signal T2 according to embodiment 2 comprises a plurality of GNSS receivers, 213(*i*), each receiver configured to generate a server GNSS output raw-data signal R7(T2(*i*)) based at least on one or more first satellite signals. A processor, e.g. a GNSS processor 218, is configured to generate a precise orbits and clocks signal C10(T2) embedding a timescale signal T2 based on all server GNSS raw-data signals R7(T2(*i*)). The processor (e.g. via a transceiver) broadcasts C10 to a client through communications network 206.

Each GNSS receiver 213(*i*) is configured to generate the server GNSS output raw-data signal R7(T2(*i*)) based on a precise clock signal T2(*i*), like an atomic clock signal. In an embodiment, the precise clock signal may be that generated by a precise clock, e.g. an atomic clock, of at least one, or all, of the plurality of GNSS receivers. Alternately or in addition thereto, in another embodiment, the precise clock signal may be that generated by a precise clock inherent to the at least one satellite 205(*s*).

The plurality of GNSS receivers are, preferably, globally distributed for an improved time dissemination performance (through better geometry for the precise orbits calculation and redundant tracking of the satellites in all possible orbit positions).

FIG. 5 shows a general purpose computer 500 which may be configured to carry out the method described in any of the above embodiments. The computer may form part of the client or the server setup.

The computer 500 comprises processor 501 which may be configured to perform any of the above mentioned steps in embodiments 1-3. The processor may operate as a central processor or have distributed functionalities. It may include integrated circuits (ICs), micro-controllers, a programmable logic controller, application-specific processors, digital signal processors, and/or any other programmable circuits. Computer 500 further comprises memory 502 configured to store data in relation with any of the described steps. The memory may include a volatile and/or non-volatile memory. The memory devices may include a random access memory (RAM), read only memory (ROM), one or more hard disk drives, optical drives, solid-state storage devices, and/or other suitable memory elements. Computer 500 may further include an input module 503, which may be configured to operate with different user input methods, e.g. touch screen, gesture control etc. It may also receive and/or transmit data via communications module 505. The computer further comprises an output display, configured to display intermediate and/or final results of timescale dissemination. All components are interconnected with one another via a bus 506.

While the present disclosure has been described with the above described exemplary embodiments, various changes and modifications may be suggested to one skilled in the art. For example, the skilled person understands that although the invention has been described in context of a hydrogen maser the method can also be used for use with any cesium standard or rubidium standard. It is intended that the present disclosure encompass such changes and modifications as falling in the scope of the appended claims.

The invention claimed is:

1. A method of dissemination of a timescale signal from at least one server site to at least one client site, the method comprising:

running a plurality of server Global Navigation Satellite Systems (GNSS) processes at different locations, each GNSS process running configured to generate a server GNSS output raw-data signal based at least on one or more received first satellite signals;

receiving the GNSS output raw-data signals at the at least one server site;

generating, at the at least one server site, a precise orbits and clocks signal embedding the timescale signal based on the server GNSS raw-data signals;

broadcasting the precise orbits and clocks signal via a telecom network from the at least one server site to the at least one client site;

running, at the at least one client site, a client GNSS process configured to generate a client GNSS output raw-data signal based on a client clock signal and one or more second satellite signals; and running, at the at least one client site, a client Precise Point Positioning (PPP) process configured to receive the client GNSS output raw-data signal and the precise orbits and clocks signal via the telecom network; and to generate a difference signal between the client clock signal and timescale signal.

2. The method of claim 1, wherein the client clock signal is generated at the client site.

3. The method of claim 1, wherein the precise orbits and clocks signal is generated based on an atomic clock signal.

4. The method of according to claim 1, wherein the precise orbits and clocks signal is generated based on clock information of a GNSS receiver clock or at least one satellite clock.

5. The method according to claim 1, wherein the client clock signal is produced by a disciplined oscillator based on the difference signal as a feedback signal.

6. The method according to claim 1, wherein the at least one server site comprises a plurality of globally distributed GNSS receivers.

7. The method of claim 1, further comprising:

generating, at a first client site, a first difference signal between a first client clock signal and the timescale signal;

generating, at a second client site, a second difference signal between a second client clock signal and the timescale signal; and comparing the first difference signal with the second difference.

8. The method of claim 1, wherein generating the precise orbits and clocks signal further comprising:

running, at the at least one server site, a server PPP process configured to receive the server GNSS output raw-data signal and a PPP correction signal;

generating a server precise orbits and clocks timescale offset signal;

generating the precise orbits and clocks signal based on the server precise orbits and clocks timescale offset signal.

9. A system comprising:

a plurality of server sites configured to:

run a plurality of server Global Navigation Satellite Systems (GNSS) processes, each GNSS process configured to generate a server GNSS output raw-data signal based at least on one or more received first satellite signals;

generate, at one or more server sites of the plurality of server sites, a precise orbits and clocks signal embedding a timescale signal based on the server GNSS raw-data signals; and broadcast, from the one or more server sites to at least one client site, the precise orbits and clocks signal via a telecom network; and at least on client site configured to:

run a client GNSS process configured to generate a client GNSS output raw-data signal based on a client clock signal and one or more second satellite signals; and run a client Precise Point Positioning (PPP) process configured to receive the client GNSS output raw-data signal and the precise orbits and clocks signal via the telecom network; and to generate a difference signal between the client clock signal and timescale signal.

10. The system of claim 9, wherein the client clock signal is generated at the client site.

11. The system of claim 9, wherein the precise orbits and clocks signal is generated based on an atomic clock signal.

12. The system of claim 9, wherein the precise orbits and clocks signal is generated based on clock information of a GNSS receiver clock or at least one satellite clock.

13. The system of claim 9, wherein the client clock signal is produced by a disciplined oscillator based on the difference signal as a feedback signal.

14. The system of claim 9, wherein the at least one server site comprises a plurality of globally distributed GNSS receivers.

15. The system of claim 9, further comprising:

at a first client site generate a first difference signal between a first client clock signal and the timescale signal;

at a second client site: generate a second difference signal between a second client clock signal and the timescale signal; and compare the first difference signal with the second difference.

16. The system of claim 9, wherein generating the precise orbits and clocks signal further comprising:

at the at least one server site:

run a server PPP process configured to receive the server GNSS output raw-data signal and a PPP correction signal;

generate a server precise orbits and clocks timescale offset signal; and generate the precise orbits and clocks signal based on the server precise orbits and clocks timescale offset signal.

17. A system comprising:

a plurality of server sites configured to:

run a plurality of server Global Navigation Satellite Systems (GNSS) processes, each GNSS process configured to generate a server GNSS output raw-data signal based at least on one or more received first satellite signals;

generate, at one or more server sites of the plurality of server sites, a precise orbits and clocks signal embedding a timescale signal based on the server GNSS raw-data signals; and broadcast, from the one or more server sites to at least one client site, the precise orbits and clocks signal via a telecom network.

18. The system of claim 17, further comprising:

at least on client site configured to:

run a client GNSS process configured to generate a client GNSS output raw-data signal based on a client clock signal and one or more second satellite signals; and run a client Precise Point Positioning (PPP) process configured to receive the client GNSS output raw-data signal and the precise orbits and clocks signal via the telecom network; and to generate a difference signal between the client clock signal and timescale signal.

19. The system of claim 18, wherein the client clock signal is generated at the client site.

20. The system of claim 17, wherein the precise orbits and clocks signal is generated based on an atomic clock signal.

* * * * *